Nov. 15, 1966     J. J. DAILEY     3,285,680
BEARING
Filed June 26, 1963
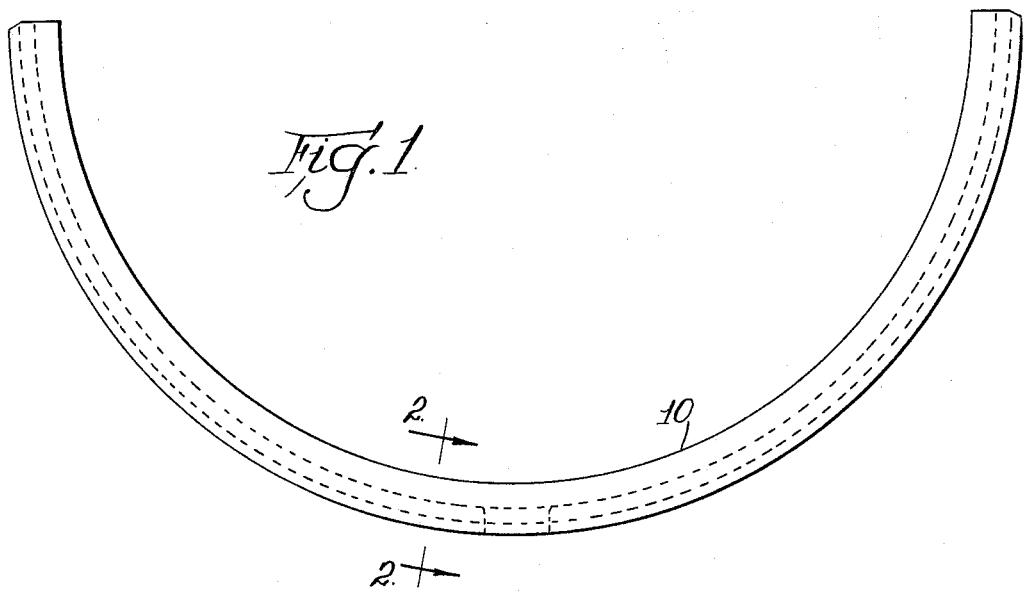
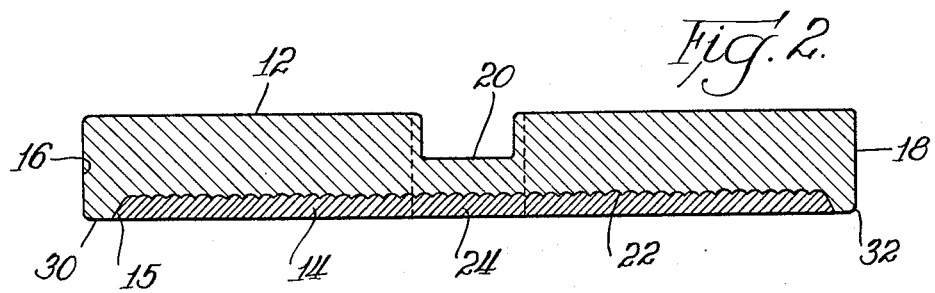
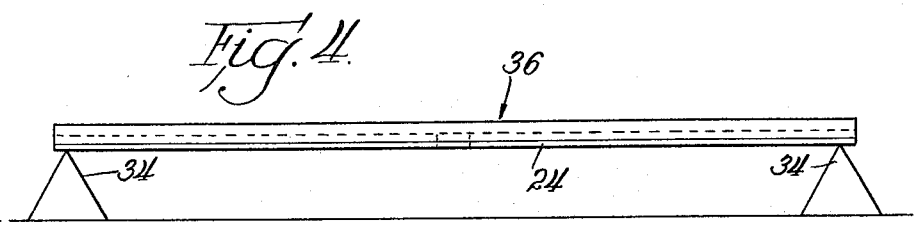
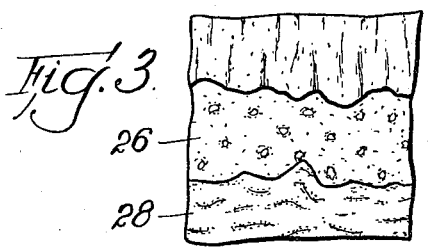
INVENTOR.
Joseph J. Dailey
BY
Watson D. Harbaugh
Atty.

United States Patent Office 3,285,680
Patented Nov. 15, 1966

3,285,680
BEARING
Joseph J. Dailey, deceased, late of East Peoria, Ill., by Helen G. Dailey, legal representative, 312 Brookview Road, East Peoria, Ill.
Filed June 26, 1963, Ser. No. 321,990
11 Claims. (Cl. 308—237)

This application is a continuation-in-part of application Serial No. 477,007, filed December 22, 1954, now abandoned.

This invention relates to bearings and more particularly to a laminated sleeve bearing having a reinforcing outer metal layer molecularly bonded to a relatively plastic metal bearing portion.

Laminated sleeve bearings have traditionally been provided with a working base of white metal or Babbit metal fused to a reinforcing back made either of steel or bronze so that the bearings may be used with connecting rods, crank shafts, cam shafts, or the like where the bearing is split for installation and servicing. Generally speaking, the use of laminated sleeve bearings also has the additional attraction that they can be used in a smaller housing diameter than other bearings and at a relatively low cost.

Aside from Babbit or like metals having low temperature softening points and being harmed by certain lubricants and lubricant additives, one of the major problems in the use of such bearings is the fact that there has been lacking a sufficiently good integration between the backing member and the working metal to stand up under heavy stresses and high frequency vibrational movement without distortion, seizeure or breaking down. Thus the sleeve bearing must withstand high frequency vibration, and, relatively great compression forces directed from the interior thereof which create a tension along the outer surface thereof and which tends to pull those surfaces apart along a transverse line in back of the line of greatest compression stress. Both of these factors working together are quite destructive. Furthermore, in view of the fact that the bearings are initially supported at heterogeneous points often spaced from the points of greatest compression, as at the ends or at one or more intermediate points of a split bearing, these forces increase the tearing action on the back surfaces and impose localized strains upon the backing member due to the yieldability of the babbit. Also making the bearing out of two dissimilar metals assists in combating destructive vibrations.

When the bond between the reinforcing back and the working metal is insufficiently strong the forces of tension warp or rend the outer portions of the working metal and reduce the reinforcing effect of the relatively hard backing metal so that the entire structure is weakened and the effective life of the bearing substantially reduced. Moreover, with low heat conductivity of Babbitt metal, the bearing runs warmer than is otherwise necessary and is dependent a great deal more upon being cooled by lubricant.

It is accordingly an object of the present invention to provide an enduring bond between a comparatively thick body of relatively high melting point working metal of high heat conductivity adapted to resist compressive forces and a comparatively thin body of relatively hard metal adapted to resist forces of tension to provide a stronger reinforcing in a bearing for operation with case hardened shafts, etc., under high speeds and high loads.

Another object is to provide a bearing having a thick aluminum journal portion of high heat conductivity to minimize localized heat buildups and a comparatively thin stainless steel backing bonded thereto in permanent and intimate relationship, said bearing being impervious to deleterious effects of lubricants and lubricant additives.

Another object of the present invention is to provide a backing for a laminated sleeve bearing which will provide exceptionally strong resistance to compressive forces throughout its inner portions and to tension stress along the outer portions thereof.

Another object is to provide a bearing having the structure at the bearing surface and the advantages of a thick block of high heat conductive working metal plus the structure and advantages of the reinforcing backing of high tensile metal molecularly bonded for tension-resistant effect along the interfaces of the metals.

A further important object of the invention is to provide an improved and economical method whereby a metal backing portion may be incorporated in a hard light weight aluminum or duralumin bearing during the manufacture or repair of the same.

These, together with various other objects and features of the invention which will later become apparent as the following description proceeds, are attained by the present invention, a preferred embodiment of which has been illustrated by way of example in the accompanying drawings, wherein:

FIG. 1 is a top plan view of a bearing having a hardened backing portion in accordance with the principles of this invention;

FIG. 2 is a vertical sectional view taken along the line 2—2 of FIG. 1;

FIG. 3 is an enlarged fragmentary view also taken along the line 2—2 of FIG. 1 disclosing the construction of the bond between the relatively hard backing portion of the bearing and the relatively plastic portion thereof; and FIG. 4 is a diagrammatic representation of the stresses exerted on the bearing during operation.

The following abridged table of properties of metals will be helpful in understanding the invention:

|  | Melting Point, °C. | Boiling Point, °C. | Latent Heat of Vaporization, Cal. gr. |
| --- | --- | --- | --- |
| Molybdenum | 2,620 | 4,803 | 177 |
| Iron | 1,535 | 2,998 | 1,110 |
| Aluminum | 657 | 2,056 | 1,950 |
| Titanium | 1,800 | 5,100 | 1,320 |

The improved bond between the two metals of the bearing is formed by using an intermediate bonding material whose melting point is preferably above the boiling point of one of the metals bonded and above the melting point of the other metal bonded. The intermediate material is sprayed in molten condition at a temperature above its melting point against said one metal when raised to its normal working temperature to vaporize a thin outer layer thereof and deposit the sprayed material upon an unoxidized surface. Vaporizing the thin outer layer removes oxides and surface impurities and with the sprayed metal solidifying first some of the vaporized metal condenses and solidifies on the outer surface of the intermediate material. Thereafter spraying the other metal in molten condition on the exposed intermediate material having the condensed metal on its exposed surface alloys the other metal with the condensed metal to the extent that it is present and thereafter the remaining content of the other metal sprayed on is pure and provides sufficient stock for finishing or machining purposes.

In particular, the bond is preferably formed by directing molten molybdenum against a body of aluminum heated, for example, by infra-red lamps to approximately 450° F. Higher temperatures can be employed but such preferably should be below the annealing temperature of the aluminum. Thus a thin layer of molybdenum is deposited that is thoroughly and molecularly bonded to pure aluminum without an intervening layer of oxidized aluminum. Stainless steel is then sprayed against the molybdenum layer and a layer of substantial thickness of ferrous aluminate appears between the molybdenum and the layer of pure stainless steel. Thus from the three metals employed, four layers of metal result bonded so intimately that crush tests disclose that fractures occur without respect to inter-faces. This bond is established regardless of whether the starting surface is smooth or roughened and is maintained throughout the temperature range up to the melting point of the metal having the lowest melting point which in this case is aluminum, the characteristics of which remain substantially constant at all expected bearing temperatures.

The tension-resistant stainless steel backing is set in the aluminum bearing by incorporating in the outer surface of the bearing and spaced slightly from the marginal edges thereof a peripheral groove adapted to receive therein the relatively harder material in order to provide a backing which will resist the effect of the non-uniform support stresses on the bearing and shall be bonded to the light weight material in an improved and more secure manner to have also a highly desirable heat exchange relationship between the light weight metal and the hard metal.

Reference in now made specifically to the drawings wherein like numerals designate similar parts throughout the various views. Numeral 10 designates a split sleeve bearing such as one made of an aluminum or an alloy or the like, although what follows is equally applicable to unitary annular bearings.

The bearing is provided with an inner compression resistant portion 12 and an outer relatively tension-resistant portion 14, the inner surface being grooved intermediate opposite edges 16 and 18 in suitable manner to provide an oil distributing or lubricating means for the bearing.

Referring now to FIG. 2, it will be seen that there is provided a relatively wide circumferential groove or channel 22 extending from a line adjacent the margin of the edge 16 to the corresponding marginal edge 18 and preferably spaced a slight distance therefrom to provide a relatively thick aluminum wall. In applying the metals as described the surface of the channel 22 is chemically cleaned and preferably mounted on a turntable or a lathe (not shown) with infra-red lamps directed against it to bring the temperature of the entire body up to approximately 450° F. as already indicated. This vaporizes the moisture and any cleaning fluid that may remain and the heat expands the aluminum to its normal working expansion. A conventional metallizer or metal spraying gun is then loaded with molybdenum and molybdenum is sprayed at a spray distance of three inches and less into the groove to a depth of .0015 to .003 of an inch at a temperature well above its melting point. Then preferably a stainless steel having a high chrome content and some nickel is loaded in the gun and the groove is filled as at 24 with this metal to a point substantially above the surface of the portion 14. Thereafter the over-spray is ground off preferably under a coolant to produce a smooth cylindrical surface which is coplanar with the marginal edges 30 and 32 adjacent the edges 16 and 18. The thickness of the backing may be varied to meet differing requirements and sizes of bearing, although thickness of approximately ⅛ of an inch, for example, has been found suitable in a bearing having a four-inch radius and ½ inch thickness. The thinner the backing is the more rapid the heat conduction away from the bearing surface. Thus a heavy block of aluminum with all of its advantages as a bearing material is provided with a thin backing layer of high tensile metal such as stainless steel.

Vaporization of the oxidized surface of the aluminum places the molybdenum in intimate bonded relationship with unoxidized aluminum stock, the vaporized aluminum forming a temporary but protective atmosphere until the molybdenum begins to solidify; and since aluminum has the lower melting point, the vapor aluminum condenses susbsequently on top of the molybdenum. Thereafter, the condensed aluminum, if not chemically removed, is brought to molten state to alloy with the first layers of the stainless steel being sprayed on in the next step. This diffusion develops a layer of ferrous aluminate ($FeAl_3$), as seen in FIG. 3 at 26, which bonds well with the molybdenum and with the steel that is being applied. After there is no more aluminum to alloy it, the stainless steel 28 is applied pure. Thus a very enduring bond providing good heat exchange relationship between the metals with or without the $FeAl_3$ and effective resistance to forces of tension involved is achieved, so that, as described, crush tests produce fractures without regard to the inter-faces.

As seen in FIG. 2, in the manufacture of this bearing the exposed surface 22, including the walls thereof, is preferably serrated to provide a large number of points and irregular portions or grooves which are adapted to intimately engage the material of the hardened portions for interlocking as well as bonding the same to the bearing. The serrated portions may be formed, for example, by knurling the surface of the walls and the bottom of the channel or in any other desired manner.

After the serrated portions are formed in the channel, molten molybdenum and stainless steel are sprayed successively into the channel as already described. Here again, after the spraying operation is completed, the hardened body portion 24 will not only fill the channel 22 but will extend above the surfaces 30 and 32 to be ground off and machined.

Thus upon the completion of the process, the hard metal is intimately bonded in efficient heat transmitting relation to the heat conducting walls of the aluminum or other light weight metal, resulting in a bearing which is capable of withstanding the tension forces exerted on the outer portions, without sacrificing the compression resisting and friction reducing qualities of the light weight metal portion of the bearing.

Referring now to FIG. 4, a diagrammatic representation of the stresses involved may be seen, wherein the support forces 34 are disclosed as exerted at individual points on the outer surface of the bearing (for example, by clamps for a split ring bearing), while 36 represents compressive force exerted by the shaft journalled in the bearing. It will be appreciated that the resulting tension on the outer surface of the bearing will otherwise tend to create fracturing opposite the locus of the force 36, which may be successfully countered by means of the backing member 24 and the sound bond between the backing member 24 and the bearing portion 12.

On a pragmatic basis, the molecular bond is well established, despite the fact that the theory of the formation of the bond is not completely understood. For instance, although the presence of the layer of ferrous aluminate is believed to come from precipitation of the vaporized aluminum when the molybdenum is applied, its presence, aside from being apparently of benefit in the bonding, indicates that the molybdenum is bonded with pure aluminum. This is borne out by FIG. 3. There is no layer of aluminum oxide between the aluminum and molybdenum. The precipitation can be removed if desired before the stainless steel is applied and an excellent bonding relationship can be accomplished with the pure stainless steel on the molybdeum, but the presence of the ferrous aluminate is preferred to pair with the aluminum as alternate layers of metals having essentially the same coefficient of heat expansion. Then, too, titanium having a high boiling point can also be used as an intermediate material in an oxygen free atmosphere. Consequently, the high melting points and boiling points of these two metals indicate that there is sufficient heat present to vaporize the aluminum which does not begin to precipitate until after the molybdenum or titanium begins to solidify and bond with the pure aluminum, thus assuring a bond between pure metals without contamination by the aluminum oxide. In fact, it can be expected that since the aluminum is melting and vaporizing just prior to the time that the molybdenum begins to set and after a turbulent spraying application, the purity of the aluminum bonding with the molybdenum is assured even to mixture of the molecules at the inter-face.

The intensity of the molecular action at the inter-face can be appreciated when it is noted that the boiling point of aluminum is 2056° C. and the latent heat of vaporization requiring further calories is 1950 calories per gram and the boiling point of stainless steel is over 2998° C. The use of molybdenum which melts at 2620° C. and is molten up to 4803° C. (titanium to 5100° C.) indicates the range of heat that can be applied to assure vaporization of the surface of the aluminum. The converse is equally advantageous because the high latent heat of vaporization requirements of aluminum prevents too much vaporization of aluminum and also rapidly cools the molybdenum below its melting point at the interface so that the application, vaporization and cooling occurring is substantially instantaneous above the approximate temperature of 2620° C. and the molybdenum solidifies before the aluminum does at the interface. Thereby the harder metal is accommodated at the interface bonding by the aluminum solidifying subsequently at less than 650° C. The stainless steel then melts the aluminum precipitate above 1535° C. but below 2998° C. and the molecular activity results in ferrous aluminate if the aluminum has not been removed and the bonding is completed.

Other metals could also serve as intermediate material if their boiling point is high enough that aluminum is vaporized preferably without the metal reaching its own boiling point. Cobalt and nickel could be used in this connection under careful control of temperature, the calories per gram ratio between the metals being important. There should also be enough calories present in the applied metal below its boiling point to cause some vaporization. Not only does the high temperature of the work pieces at 450° F. and the higher velocity energy of a short spray cone assist in providing calories for nonoxidized metal interface bonding but also a further source of calories is present in the applied metal above its melting point and below its boiling point which at impact with the base metal operate to cause vaporization of the oxidized metal at its surface.

It has been found that molybdenum with a conventional manual metallizing gun at a spray distance of three inches and less with the temperature of the aluminum work piece 450° and more gives the best all around comparative results. In production some leeway is tolerated with molybdenum in setting up the spray distance between the nozzle of the spray gun and the work because of the wide caloric content range possible with the wide molten temperatures range present with molybdenum (2620° C. to 4803° C.) with its lower limit above the boiling point of the aluminum (2620° C.). This enables a closer control economically and structurally with better predictability of the vaporization and resulting intimate bonding of the metal. Although titanium has a wider molten range (1800° C. to 5100° C.) above the boiling point of aluminum, such is not sufficiently advantageous to out balance the dangers of nonvaporization of aluminum that exist with its lower molten limit since the caloric significance of such is comparatively so far below the boiling point of aluminum that greater care is required to overset the gun close enough to accomplish vaporization of the oxidized aluminum surface in case temperatures at point of spray impact might vary from time to time. For the filling metal a 3½" spacing gives the best degree of hardness which should be within the range of Rockwell C 23 to 26 for grinding and groove cutting operations.

While the relatively plastic inner surface of the bearing is usually formed of an alloy of lead and tin or Babbitt metal, it has been found that the use of aluminum for bearing journal surfaces is desirable as regards weight, resistance to compression and friction reducing characteristics, and the above-described bond with the stainless steel produces an extremely strong yet resilient bearing which is impervious to lubricants and lubricant additives.

From the foregoing, it will be seen how the various objects of the invention are accomplished and how various and further changes and modifications can be made without departing from the spirit of the invention, the scope of which is commensurate with the appended claims.

What is claimed is:

1. A light weight bearing made of aluminum alloy and a circumferential reinforcing back formed thereon of a material relatively heavier than aluminum alloy, said circumferential portion being intimately bonded to an unoxidized surface of the material of the bearing within the circumference thereof by a metal whose melting point is above the boiling point of aluminum and an intermetallic compound of said alloy and heavier material in that an oxidized surface of the aluminum alloy has been vaporized away by applied particles of the higher melting point metal that are embedded in the unoxidized aluminum alloy at said unoxidized surface.

2. A light weight bearing having a light weight bearing material portion, a circumferential portion bonded to said bearing material of a material relatively heavier than said bearing, and intimately bonded thereto in good heat exchange relation therewith, the interfaces of said relatively light metal portion and said relatively heavier portion being unoxidized and configured to afford interlocking action therebetween and including a metal having a melting point above the boiling point of the metal of the bearing material wherein an oxidized surface of the bearing metal has been vaporized away by applied particles of the high melting point metal which are embedded in the unoxidized bearing metal at their unoxidized interfaces, and an intermetallic compound of the two materials of said bearing circumferential portion, the bond extending beneath the surface of said portion.

3. A light weight bearing including a semi-cylindrical bearing portion of a metal containing a large percentage of aluminum and having a first channel formed therearound, said bearing member having a semi-circular second channel formed externally therein and having divergent side walls, a reinforcing back portion received in said second channel and defining in part the outside surface of said bearing member and being formed of a ferrous material relatively heavier than said metal of the bearing portion, said back being intimately bonded to unoxidized metal of said bearing portion in good heat exchange relation therewith with an intervening layer of molybdenum molecularly bonded therewith by an oxidized surface of the bearing metal in said second channel having been vaporized away by particles of the molybdenum that are embedded in unoxidized metal of said bearing position.

4. A bearing having a bearing portion of light weight metal material, a circumferential portion secured to the back thereof and defining in part the supported surface of said bearing and formed of a material relatively heavier than said bearing metal, and means for bonding the two materials together including a layer of molybdenum in intimate molecular bond with an unoxidized surface of said material, said metal layer of molybdenum being characterized as sprayed upon the metal material of said bearing to vaporize away any unoxidized surface thereon with spray particles of the molybdenum that are embedded in the unoxidized metal material at said unoxidized surface.

5. A laminated sleeve bearing comprising a body portion made of a metal containing a large percentage of aluminum, a circumferential portion of a ferrous material less than one-fourth the thickness of said body of metal molecularly bonded thereto by molybdenum in intimate molecular bonded relation with unoxidized metal of said body portion in that an oxidized surface of the body portion metal has been boiled away by particles of said molybdenum that are embedded in unoxidized metal of said body portion at said unoxidized surface.

6. A laminated sleeve bearing comprising a body portion made of metal bearing surface containing a large percentage of aluminum, a coating of molybdenum bonded to unoxidized metal on the non-bearing surface thereof in that an oxidized surface of the body portion metal has been boiled away by particles of said molybdenum that are embedded in unoxidized metal of said body portion at said unoxidized surface, a ferrous aluminate layer bonded to said molybdenum, and a stock of stainless steel bonded to said layer as a reinforcement backing for said body portion.

7. A laminated sleeve bearing for internal combustion engines having a bearing member made of a metal containing aluminum and having a circumferential contour in the outer non-bearing wall thereof which includes a channel filled with backing metal, said channel being characterized in that it extends across the outer face of said bearing in spaced relation to the marginal edges thereof, and said backing metal filling said channel including a layer of bonding metal in said channel whose caloric content when its temperature approaches its boiling point is above the boiling point of said metal containing aluminum and a ferrous backing metal bonded to said layer of metal having a melting point above 675° C., said bonding metal being intimately bonded to unoxidized metal of said bearing member in that an oxidized surface of said bearing member in said channel has been boiled away by particles of said bonding metal that are embedded in said unoxidized metal at their interface, said ferrous metal having a surface substantially coplanar with the surface of said bearing metal along the outer marginal edges of said bearing.

8. In combination with a bearing, a bonded laminate of four different metals with pairs of alternate metals of approximately the same coefficient of expansion with the one of the metals upon the bearing surface comprising a light weight metal bonded to the next layer of metal at interfaces free of oxidized metal in that an oxidized surface of the light weight metal has been boiled away by particles of said next layer that are embedded in unoxidized light weight metal at their interface.

9. A light weight bearing including a light weight bearing metal portion having an oil receiving groove disposed intermediate the side edges thereof and a circumferential portion embedded in said bearing portion which is of relatively heavier metal than said bearing portion, said circumferential portion being intimately bonded to an unoxidized surface of the bearing metal and in good heat exchange relation therewith by intermediate films of molybdenum and an intermetallic compound of the materials of said bearing and circumferential portion, said bearing metal having had an oxidized surface boiled away by particles of said heavier metal embedded in unoxidized bearing metal at their interface, said circumferential portion being substantially coplanar with the outer marginal surfaces of said bearing.

10. A light weight laminated sleeve bearing having a light weight bearing metal portion and a circumferential portion mounted on said bearing portion of a material relatively heavier than said bearing, said circumferential portion being intimately bonded to said bearing portion at an unoxidized interface surface by an intermediate film layer of molybdenum and a layer of an intermetallic compound of the materials of said bearing and circumferential portion, said bearing metal having had an oxidized surface boiled away by particles of said molybdenum embedded in unoxidized bearing metal at said interface surface.

11. A laminated sleeve bearing of a light weight bearing material having a circumferential channel, a circumferential reinforcing portion bonded thereto in said channel and formed of a material relatively heavier than said bearing material, said circumferential portion having a molecular bond with said bearing material within said channel of an intermetallic compound of the two materials of the bearing and circumferential portion and being in good heat exchange relation therewith through a thin layer of molybdenum, said channel having a serrated unoxidized surface intimately bonded to said molybdenum in that an oxidized surface of said bearing material within said channel has been vaporized away by particles of said molybdenum penetrating unoxidized bearing material at said unoxidized surface.

References Cited by the Examiner
UNITED STATES PATENTS

| | | | |
|---|---|---|---|
| 2,531,910 | 11/1950 | Hensel et al. | 308—237 |
| 2,588,421 | 3/1952 | Shepard | 117—71 |
| 2,588,422 | 3/1952 | Shepard | 308—241 |
| 2,631,905 | 3/1953 | Coppen | 308—240 |

DAVID J. WILLIAMOWSKY, *Primary Examiner.*

FRANK SUSKO, *Examiner.*